US005659415A

United States Patent [19]
Staver et al.

[11] Patent Number: 5,659,415
[45] Date of Patent: Aug. 19, 1997

[54] ULTRAFAST OPTICAL MODULATOR

[75] Inventors: Phillip Randall Staver, Hagaman; William Taylor Lotshaw, Schenectady, both of N.Y.

[73] Assignee: General Electric Company, Schenectady, N.Y.

[21] Appl. No.: 605,417

[22] Filed: Feb. 22, 1996

[51] Int. Cl.$^6$ ...................................................... G02F 1/03
[52] U.S. Cl. ............................. 359/244; 359/299; 385/5
[58] Field of Search ..................................... 359/244, 299; 385/5

[56] References Cited

U.S. PATENT DOCUMENTS

| | | | |
|---|---|---|---|
| 4,339,199 | 7/1982 | Jones et al. | 356/213 |
| 4,900,134 | 2/1990 | Inoue et al. | 350/354 |
| 4,983,024 | 1/1991 | Boothroyd et al. | 350/354 |
| 5,076,672 | 12/1991 | Tsuda et al. | 359/244 |
| 5,126,874 | 6/1992 | Alfano et al. | |
| 5,150,248 | 9/1992 | Alfano et al. | |
| 5,307,199 | 4/1994 | Urakami et al. | 359/244 |
| 5,463,485 | 10/1995 | Alfano et al. | |

OTHER PUBLICATIONS

Bridges et al., "Effect of Beam Ellipticity on Self-Mode Locking in Lasers" *Optics Letters*, vol. 18, No. 23, Dec. 1993, pp. 2026–2028.

*Primary Examiner*—Mark Hellner
*Attorney, Agent, or Firm*—Tyler Maddry; Donald S. Ingraham

[57] ABSTRACT

An optical modulator includes pump and signal lasers optically aligned with an optical modulator element having a nonlinear refractive index. In operation, a pulsed optical pump beam is focused inside the modulator element for obtaining oscillatory sagittal and tangential mode radii thereof. A signal beam is propagated through the focus in the modulator element at a crossing angle with the spatially modulated pump beam for phase modulation thereof. Material nonlinearity due to electronic polarization or molecular orientation provides ultrafast rise times with correspondingly high modulation bandwidth.

21 Claims, 4 Drawing Sheets

ULTRAFAST OPTICAL MODULATOR

BACKGROUND OF THE INVENTION

The present invention relates generally to optical modulators, and, more specifically, to high bandwidth optical modulators.

Data transmission is accomplished using amplitude and/or phase modulation of an optical signal, such as a laser beam, for encoding the data, which is then transmitted through a fiber optic waveguide, for example. The rate at which data can be transmitted is fundamentally limited by the speed at which the optical signal can be modulated.

One type of optical or light modulator utilizes an acousto-optic effect in order to modulate a propagating light or signal beam. The signal beam is scattered off an orthogonally traveling sound wave due to the densification of a material in the presence of an applied acoustic field. The rise time for this phenomenon is on the order of nanoseconds. The rise time limits the bandwidth for such acousto-optic modulators to about several hundred megahertz.

In recent developments, electro-optical devices are based on novel materials and have demonstrated potential modulation bandwidths up to hundreds of gigahertz. However, these devices require millimeter-wave electronic drivers which are prohibitively expensive and complicated.

Accordingly, it is desired to provide an optical modulator which is relatively simple in construction and operation, and is effective for increasing modulation bandwidth orders of magnitude greater than conventional modulators to allow several generations of increase in the rate at which data can be transmitted.

SUMMARY OF THE INVENTION

An optical modulator includes pump and signal lasers optically aligned with an optical modulator element having a nonlinear refractive index. In operation, a pulsed optical pump beam is focused inside the modulator element for obtaining oscillatory sagittal and tangential mode radii thereof. A signal beam is propagated through the focus in the modulator element at a crossing angle with the spatially modulated pump beam for phase modulation thereof. Material nonlinearity due to electronic polarization or molecular orientation provides ultrafast rise times with correspondingly high modulation bandwidth.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DESCRIPTION OF THE PREFERRED EMBODIMENT(S)

Figure 1:
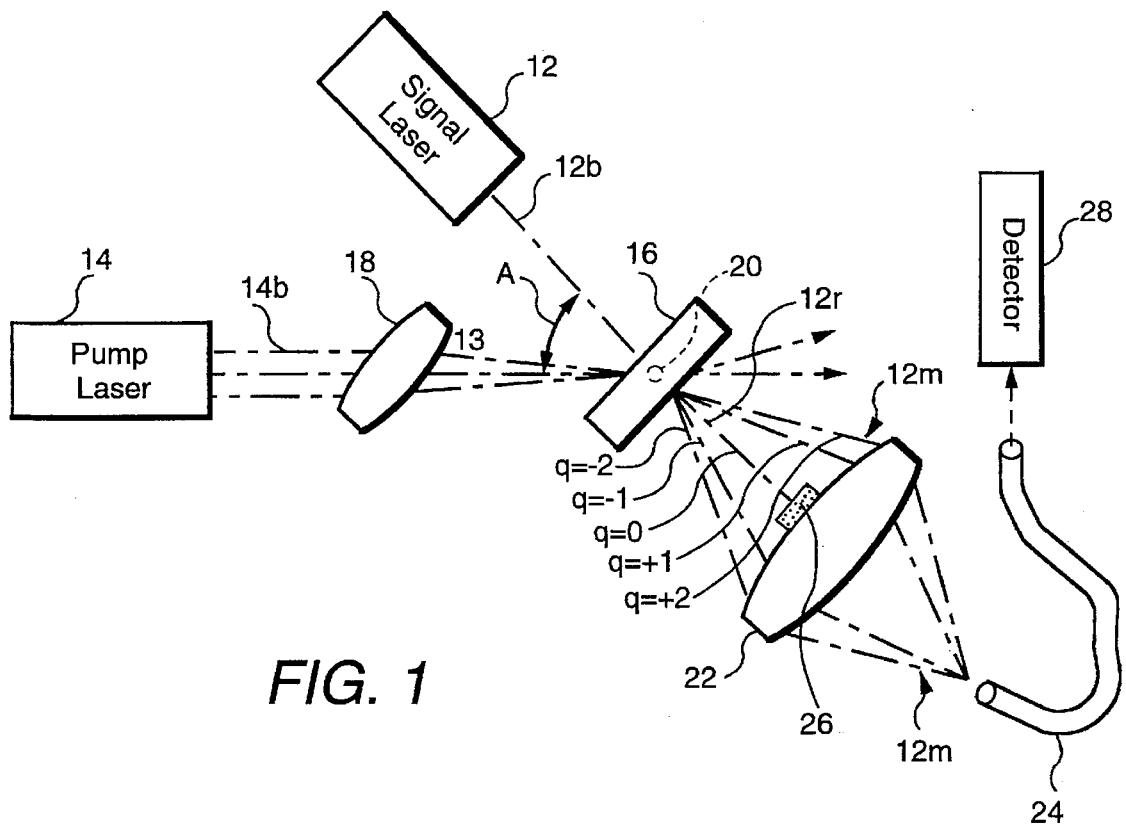
FIG. 1 is a schematic representation of an ultrafast optical modulator in accordance with one embodiment of the present invention.

Illustrated schematically in FIG. 1 is an optical modulator 10 in accordance with one embodiment of the present invention for modulating an optical signal beam 12b emitted from a conventional signal laser 12 which may have various forms as indicated hereinbelow. The signal beam 12b is optically modulated in accordance with the present invention by an optical pulsed pump beam 14b emitted from a conventional pump laser 14. The pump laser 14 may take any suitable form, and preferably has rise times as small as possible for increasing modulation bandwidth as high as possible. For example, the pump beam 14 may have a wavelength in vacuum of about 800 nanometers (nm), and a rise time on the order of femtoseconds.

The modulator 10 includes an optical modulator medium or element 16 disposed in optical alignment with the signal laser 12 for receiving the signal beam 12b which is modulated thereby forming a modulated signal beam 12m. In accordance with the present invention, the modulator element 16 has a nonlinear refractive index for obtaining oscillatory sagittal and tangential mode radii of the pump beam 14b propagating therethrough.

In the exemplary embodiment illustrated in FIG. 1, a conventional focusing element 18, such as a focusing lens, is disposed in optical alignment between the pump laser 14 and the modulator element 16. The lens 18 is tilted relative to the incident pump beam 14b so that the pump beam 14b is made non-circular or asymmetric within the modulator element 16. The lens 18 has a suitable focal length, of about 5 cm for example, and is suitably spaced from the modulator element 16 so that the lens 18 focuses the pump beam 14b at a focus 20 inside the element 16.

The nominally circular envelope of the pump beam 14b is therefore distorted into a nominal ellipse at the focus 20 inside the element 16. This causes oscillatory sagittal and tangential mode radii of the asymmetric pump beam 14b in the focus 20 which is used for generally sinusoidal oscillatory phase modulation of the signal beam 12b in accordance with the present invention. The signal and pump beams 12b and 14b are oblique to each other at the focus 20 and cross each other therein at a suitable crossing angle A.

The invention makes use of the oscillatory behavior exhibited by an asymmetric, as well as resulting astigmatic, laser beam as it propagates in a material in the presence of nonlinear refraction. The modulated intensity pattern produced by the variation in the mode radius near the beam focus produces a generally sinusoidal phase grating in the direction transverse to the signal beam 12b which is used as a diffractive modulator to the crossing, or orthogonal, propagating signal beam 12b. The bandwidth of the modulator is essentially determined by the rise time of the physical mechanism responsible for the nonlinearity present in the modulator element 16, and can be as high as about 100 terahertz. Diffraction efficiencies comparable to conventional, but slower, modulators may be obtained with the proper choice of modulator material as described below.

In the FIG. 1 embodiment of the invention, the asymmetric nature of the pump beam 14b is provided by the suitably tilted focusing lens 18. In an alternate embodiment illustrated in FIG. 2, the asymmetrical pump beam 14b is similarly effected by reflecting the pump beam 14 off a suitably tilted, conventional focusing mirror 18m. In both embodiments, the pulsed optical pump beam 14b is focused inside the modulator element 16 at the focus 20 for obtaining the oscillatory mode radii thereof. In yet another embodiment, the lens 18 and mirror 18m may be eliminated if the desired asymmetrical pump beam is otherwise provided, for example by the pump laser 14 itself, or by a suitable orientation of the modulator element 16.

Accordingly, these different embodiments define means for adjusting the input mode characteristics of the pump beam 14b for obtaining the oscillatory sagittal and tangential mode radii thereof. The input mode characteristics of the pump beam 14b include the sagittal and tangential wavefront radii of curvature, and the sagittal and tangential mode radii $w_x$ and $w_y$ described below, which terms are conventionally known.

The diffracted, and thereby modulated, signal beam 12m exits the modulator medium 16 in a series of optical orders at different angles, as labelled q=... -2, -1, 0, +1, +1, +2, ... In one exemplary embodiment illustrated in FIG. 1, these beam orders are collected by a conventional collecting means 22. The collecting means 22 may be a lens (as shown), mirror, integrating sphere, or other suitable optical device. In FIG. 1, only the non-zero lower orders between q=-2 and q=+2 are collected, for example.

However, if the application requires, more orders may be collected by increasing the numerical aperture of the collecting means. The residual beam 12r, which is spatially coincident with the zero order (q=0), is modulated with the opposite polarity as the diffracted orders. The residual beam 12r is rejected from the modulated signal beam 12m by a suitable beam block 26, such as an opaque disk disposed on the lens 22, which also blocks the zero order. The modulated beam 12m, without the residual beam 12r, is conventionally used as desired, and for example is carried through a conventional optic fiber 24 which provides a data communication link to a suitable optical detector 28 in a data transmission system.

The residual beam 12r may be separately collected, by using a mirror as the block 26 to reflect away the beam, and then imaged into a different optic fiber or detector, which may be like fiber 24 and detector 28, for use if the application deems beneficial.

Figure 3:
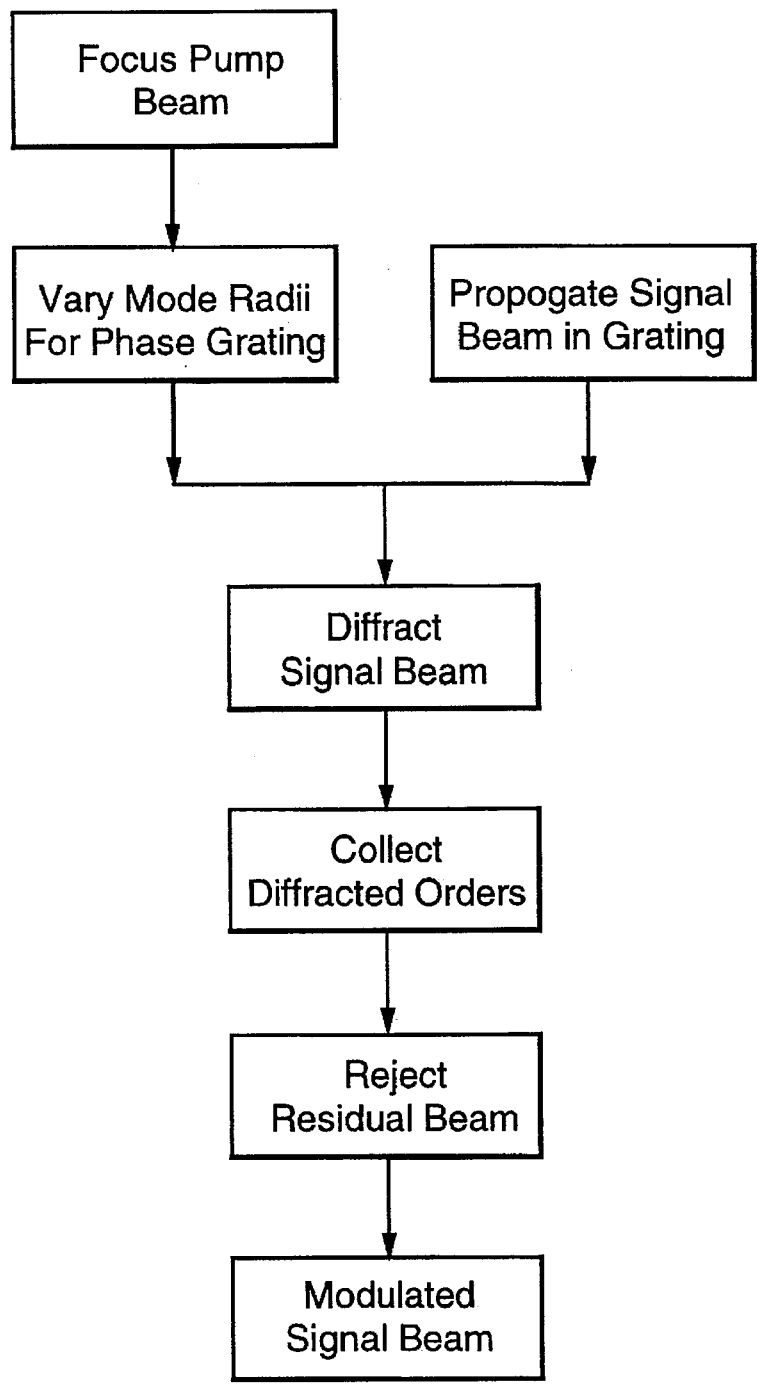
FIG. 3 is a flowchart representation of exemplary steps in a method of modulating an optical signal beam using the apparatus illustrated in FIGS. 1 or 2.

FIG. 3 illustrates schematically in flowchart form exemplary steps in the improved method of the present invention wherein varying mode radii are effected in the focused pump beam for creating phase grating through which the signal beam 12b is propagated. The signal beam 12b is thereby diffracted for generating the modulated signal beam 12m.

The focusing lens 18 or mirror 18m focuses the pulsed pump beam 14b into the nonlinear modulator element 16. The focused beam experiences a nonlinear refractive index "n" through the relationship:

$$n = n_o + n_2 I \quad (1)$$

In equation (1), n is the nonlinear refractive index experienced by the focused pump beam 14b in three dimensional space including the x-axis or sagittal, the y-axis or tangential, and the z-axis or propagation direction. The intensity of the local electro-magnetic field is designated I, which is also expressed in the x, y, z coordinates. And, $n_o$ is the linear refractive index for the modulator element 16, and $n_2$ is the nonlinear refractive index for the modulator element 16, which are both conventionally determined and are constants for specific modulator materials.

Figure 2:
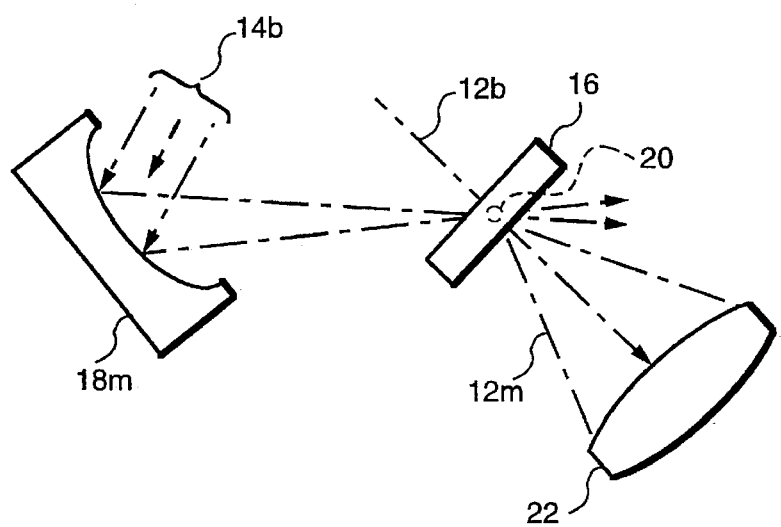
FIG. 2 is a schematic representation of an alternate embodiment of the optical modulator illustrated in FIG. 1.
Figure 4:
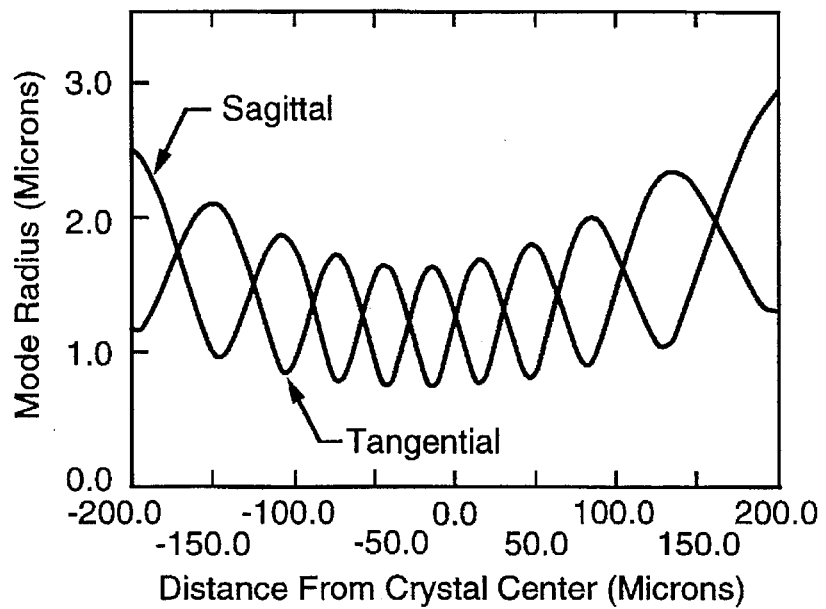
FIG. 4 is an exemplary plot of the mode radii of the pump beam illustrated in FIG. 1 inside an optical modulator element in the form of crystal.

For certain power levels, the propagating pump beam 14b in the focus 20 experiences oscillatory behavior as shown for example in FIG. 4, which is obtained from conventional nonlinear wave equations. FIG. 2 illustrates the pump beam propagating through the modulator element 16, in the exemplary form of a diamond crystal, with the pump beam 14b having a wavelength of 800 nm. The abscissa in FIG. 4 represents distance from the center of the crystal within the focus 20 expressed in microns. The ordinate plots the mode radius in microns for both the sagittal and tangential beam propagation modes. This oscillatory behavior is most pronounced when the power of the pump laser 14 is slightly greater than a threshold value at which self-focusing and diffractive powers of the pump beam cancel each other, with the envelope of the pump beam 14b propagating in a straight line. The threshold or critical value $P_c$ may be expressed as follows:

$$P_c = \alpha \cdot \frac{\lambda_o^2}{8\pi n_o n_2} \quad (2)$$

In equation (2), $\lambda_o$ is the vacuum wavelength of the pump laser beam 14b. And, the factor "a" represents an application-dependent correction factor which is conventionally determined for each application or design.

In the exemplary embodiment illustrated in FIG. 4, the pump beam 14b has a power relative to the threshold value of about 1.33, which represents the power to critical power ratio. With this power ratio, the oscillatory behavior is most pronounced.

Figure 5:
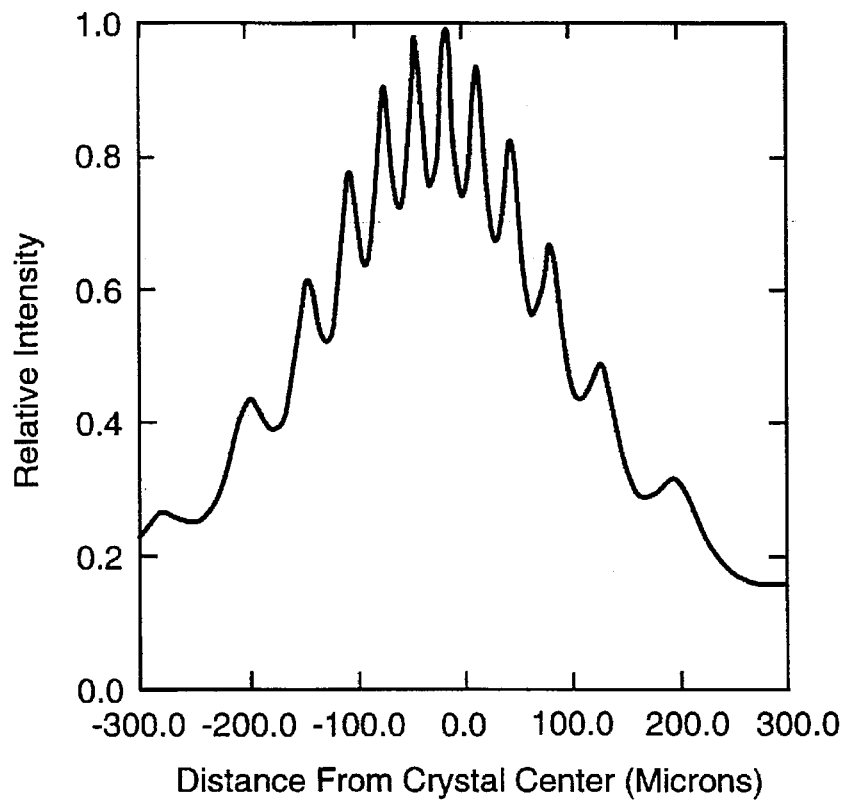
FIG. 5 is a plot of spatially modulated relative intensity of the pump beam in the focus inside the crystal element due to the oscillatory mode radii illustrated in FIG. 4.

The oscillatory behavior near the focus 20 as represented by the sagittal and tangential mode radii versus propagation distance inside the nonlinear element 16 as shown in FIG. 4 is a consequence of the x-y coupling that occurs between the two orthogonal modes in combination with the condition that the initially launched pump mode is asymmetric, as well as astigmatic, inside the nonlinear element 16. This rapidly varying mode radius causes the intensity of the pump beam 14b to be spatially modulated near the focus 20 as shown graphically in FIG. 5. FIG. 5 plots the relative axial pump beam intensity in the element 16 relative to the distance from the center of the element 16 within the focus 20. The intensity I plotted in FIG. 5 may be expressed by the following equation:

$$I = \frac{2P_t}{\pi w_2 w_y} \exp\left(-2\frac{x^2}{w_x^2} = 2\frac{y^2}{w_y^2}\right) \quad (3)$$

In equation (3), $P_t$ is the total power in the pump beam 14b. The parameters $w_x$ and $w_y$ represent the pump mode radii in the x or sagittal, and the y or tangential directions. The spatially varying intensity I results in a spatially varying refractive index through equation (1).

Since the signal beam 12b propagates at the crossing angle A relative to the pump beam 14b, it experiences a sinusoidal phase modulation, i.e., a diffraction grating, through the relationship $\Delta n = n_2 I$. The crossing angle A may have any suitable value, and may be 90° for example, indicating orthogonal crossing of the signal and pump beams 12b, 14b in the focus 20. Near the pump beam axis, and near the focus 20 of the pump beam in the modulator element 16, it can be shown that the total peak-to-peak phase excursion $\Delta\phi_t$ which the modulated beam 12m experiences is approximately equal to:

$$\Delta\phi_t \approx \sqrt{2\pi} \cdot \frac{n_o n_2 P_t}{\lambda_m} \left(\frac{w_{max} - w_{min}}{w_{max} w_{min}}\right) \quad (4)$$

In equation (4), $w_{max}$ and $w_{min}$ are the maximum and minimum spot sizes of the pump mode near the focus 20, and $\lambda_m$ is the vacuum wavelength of the signal beam 12b that is being modulated. The maximum and minimum spot sizes may be simply obtained from the peak-to-valley measurements of the mode radii plotted in FIG. 4.

The sinusoidal phase grating generated by the pump mode diffracts the signal beam into a series of diffraction orders. The power contained in the $q^{th}$ order is determined by the diffraction efficiency $\eta_q$ as follows:

$$\eta_s = J_s^2(\Delta\phi_2/2) \quad (5)$$

In equation (5), $J_q$ is a Bessel function of the first kind of order q, where q has values of zero and plus and minus integer values, i.e., 0, ±1, ±2 ... Equation (5) predicts that the diffraction efficiency increases as the wavelength of the modulated signal beam decreases. Table 1 shows the estimated diffraction efficiency for different wavelengths in an exemplary diamond crystal modulator element 16.

TABLE 1

| Laser Source | Wavelength (nm) | Phase Excursion (radians) | Diffraction Efficiency (%) |
|---|---|---|---|
| ER:glass (ω) | 1500 | 3.0 | 3 |
| Nd:YAG (1w) | 1064 | 1.0 | 6 |
| Ti:Al$_2$O$_3$ | 700–900 | 1.4 | 11 |
| Nd:YAG (2ω) | 532 | 2.1 | 21 |
| Nd:YAG (3ω) | 355 | 3.1 | 32 |

Various laser sources are provided in column 1 of the table which may be used for the signal laser 12 and the signal beam 12b emitted therefrom. The parentheticals in the laser sources indicate whether the laser beam frequency is a fundamental frequency (1ω), and corresponding wavelength, or is a higher order harmonic such as the second (2ω) and third (3ω) harmonic of the fundamental frequency, for the YAG laser examples. The wavelengths are expressed in nanometers in vacuum, and the phase excursion is the total phase excursion expressed by equation (4). The diffraction efficiency is for the first Bessel order expressed in percent.

In the exemplary embodiment illustrated in FIG. 1, both the pump beam 14b and the signal beam 12b are laser beams. They may be of the same or different type, as expressed in wavelengths. In the example illustrated in FIG. 1, the pump and signal beams are different types of laser beams, with the pump beam 14b having a wavelength of about 800 mm for example, and the signal beam 12b being selecting from any of the examples illustrated in Table 1.

Figure 6:
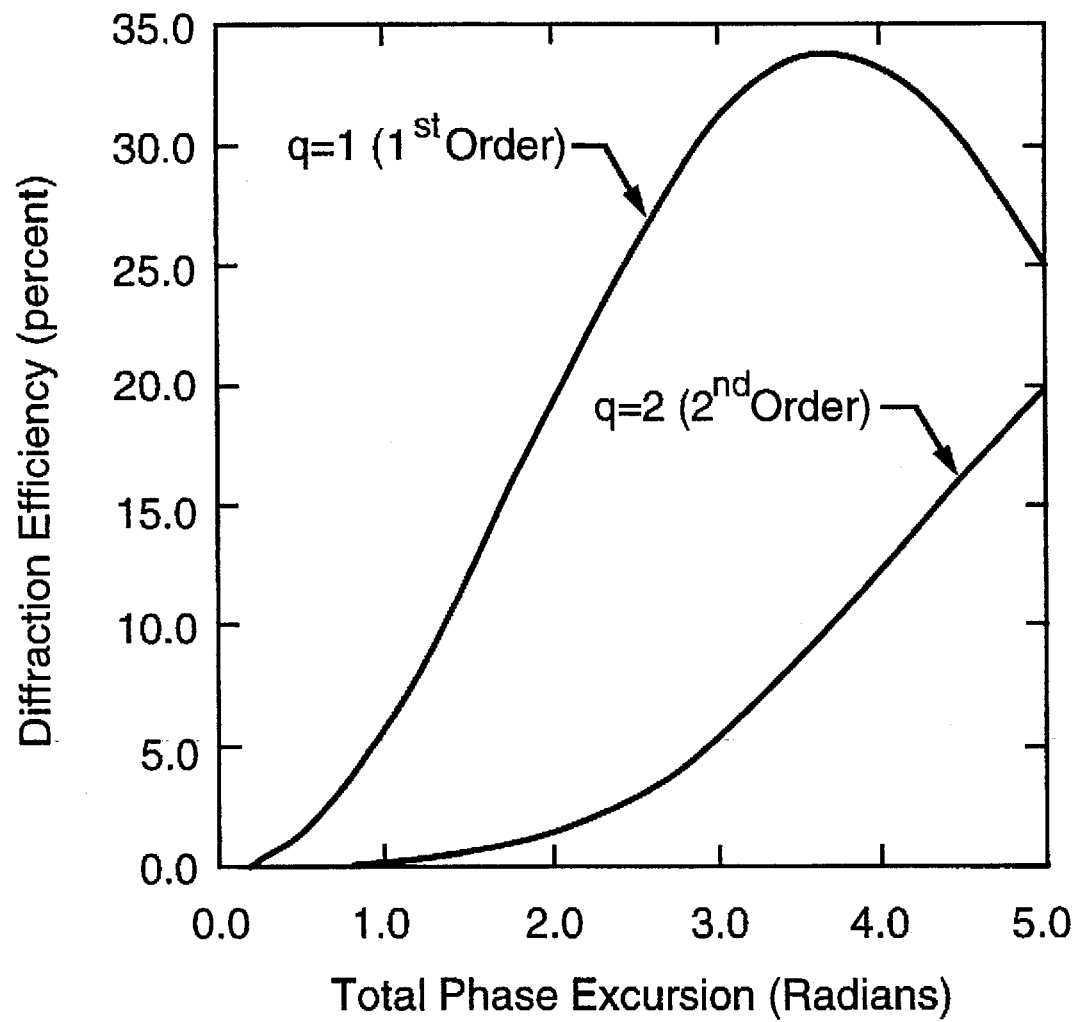
FIG. 6 is a plot of diffraction efficiency versus total phase excursion of the signal beam in the crystal element for two exemplary diffraction orders.

By varying the power level in the pump beam 14b, which changes the power to critical power ratio, the total phase modulation expressed in equation (4) can be slightly "tuned." A plot of the diffraction efficiency in the modulator element 16 as a function of total phase excursion is illustrated in FIG. 6 for exemplary first and secondary orders in the diamond crystal medium. FIG. 6 illustrates that the maximum diffraction efficiency expected for the first order (q=1) is about 33% when the total phase modulation is equal to 3.6 radians. For this particular value of total phase modulation, the second order (q=2) has a diffraction efficiency of 10%.

Accordingly, by varying the pump beam power, the total phase excursion in the signal beam 12b may be correspondingly varied so that at least one of the diffraction orders has a maximum diffraction efficiency such as the first order illustrated in FIG. 6. The last row of Table 1 indicates that a third harmonic Nd:YAG laser signal beam having a vacuum wavelength of 355 nm can experience a total phase excursion or modulation of 3.1 radians, with a 32% diffraction efficiency of the first order.

FIG. 4 illustrates that the oscillatory mode behavior has a high repetition over very short propagation distances from the center of the modulator element 16 within the focus 20. Accordingly, the propagation length of the pump beam 14b in the modulator element 16 may be made relatively small. For example, the maximum propagation optical length of the pump beam 14b in the modulator element 16 may be about equal to the size of the focus 20 within the element 16 for allowing diffraction modulation to occur. FIG. 4 illustrates that an optical length of up to about 400 microns (±200 microns) should be more than adequate for effecting diffraction modulation in accordance with the present invention, although longer lengths may be used as desired.

As indicated above, the bandwidth of the optical modulator 10 is essentially determined by the rise time of the physical mechanism responsible for the nonlinearity present in the modulator element 16 and can be orders of magnitude greater than those presently available. For example, the modulator element 16 may effect nonlinear refraction from electronic polarization in the case of a diamond crystal. The nonlinear refractive index $n_2$ for a diamond crystal is of order $10^{-15}$ cm$^2$/watt. This corresponds with a response or rise time on the order of femtoseconds having a corresponding bandwidth capability in the terahertz range.

The modulator element 16 may alternatively effect nonlinear refraction from molecular orientation in a suitable material such as liquid carbon disulfide. The nonlinear refractive index $n_2$ for carbon disulfide is of order $10^{-14}$. This corresponds with a rise or response time on the order of picoseconds, and a corresponding gigahertz bandwidth range.

For suitably small values of total phase excursion, equations (3) and (4) predict that diffraction efficiency is proportional to $(n_o n_2)^2$. Therefore the material constant $(n_o n_2)^2$ represents a figure of merit that can be used to predict how much modulation can be expected for a given material. However, because the rise time of the nonlinearity is generally inversely proportional to the value of $n_2$, there exists a trade-off in the modulation strength determined by equation (5) and the overall bandwidth of the modulator.

The optical modulator 10 described above therefore has ultrafast capability, and can provide optical modulation of the signal beam 12b without apparent limit in the modulator element 16 itself. The only apparent limitation in optical modulation, is the rise time of the pulsed pump beam 14b itself. The optical modulator 10 therefore allows for independent improvement in the rise time and bandwidth capability of the pump laser 14, without practical limit by the modulator element 16. Ultrahigh bandwidth capabilities are therefore possible, with diffraction efficiencies comparable to conventional, slower speed modulators with the proper choice of modulator material as described above.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims:

We claim:

1. A method of modulating an optical signal beam comprising:

focusing a pulsed optical pump beam at a focus inside an optical modulator element having a nonlinear refractive index for obtaining oscillatory sagittal and tangential mode radii of the pump beam; and propagating said signal beam through said focus in said element at a crossing angle with said pump beam for oscillatory phase modulation of the signal beam.

2. A method according to claim 1 further comprising varying said mode radii at said beam focus to produce a generally sinusoidal phase grating for modulating intensity of said signal beam by diffraction.

3. A method according to claim 2 further comprising powering said pump beam greater than a threshold at which self-focusing and diffractive powers of said pump beam cancel each other.

4. A method according to claim 3 wherein said pump beam is powered relative to said threshold at about a 1.33 ratio.

5. A method according to claim 2 wherein said modulated signal beam comprises a plurality of diffraction orders, and further comprising varying said pump beam power for obtaining a total phase excursion in said modulated signal beam so that at least one of said diffraction orders has maximum diffraction efficiency.

6. A method according to claim 5 wherein said one diffraction order is a first order.

7. A method according to claim 2 wherein said pump beam is a laser beam, and said signal beam is a laser beam.

8. A method according to claim 7 wherein said signal beam is a harmonic laser beam.

9. A method according to claim 8 wherein said signal beam is a third harmonic laser beam.

10. A method according to claim 9 wherein said signal beam is a Nd:YAG laser beam.

11. A method according to claim 7 wherein said signal and pump beams are different types of laser beams.

12. A method according to claim 2 wherein said modulator element has an optical length about equal in size to said focus.

13. A method according to claim 12 wherein said modulator element has an optical length up to about 400 microns.

14. A method according to claim 2 wherein said modulator element effects nonlinear refraction from electronic polarization.

15. A method according to claim 14 wherein said modulator element is a diamond crystal.

16. A method according to claim 2 wherein said modulator element effects nonlinear refraction from molecular orientation.

17. A method according to claim 16 wherein said modulator element is carbon disulfide.

18. An optical modulator for modulating an optical signal beam comprising:

an optical modulator element having a nonlinear refractive index;

a pump laser optically aligned with said modulator element for generating a pulsed pump beam focused at a focus inside said modulator element for obtaining oscillatory sagittal and tangential mode radii of the pump beam; and a signal laser optically aligned with said modulator element for generating said signal beam and for propagating said signal beam through said focus in said modulator element at a crossing angle with said pump beam for oscillatory phase modulation of the signal beam.

19. A modulator according to claim 18 further comprising a focusing element disposed in optical alignment between said pump laser and said modulator element, and being tilted relative thereto so that said pump beam is asymmetric at said focus inside said modulator element to effect said oscillatory sagittal and tangential mode radii.

20. A modulator according to claim 19 wherein said focusing element is a focusing lens or a focusing mirror.

21. A modulator according to claim 18 further comprising means for collecting diffraction orders of said modulated signal beam from said modulator element.

* * * * *